United States Patent [19]

Reime

[11] Patent Number: 5,430,551
[45] Date of Patent: Jul. 4, 1995

[54] VIDEO RECORDER WITH DISTORTION CORRECTOR CIRCUIT

[75] Inventor: Gerd Reime, Schömberg, Germany

[73] Assignee: Nokia Unterhaltungselektronik GmbH, Pforzheim, Germany

[21] Appl. No.: 135,137

[22] Filed: Oct. 12, 1993

Related U.S. Application Data

[63] Continuation of Ser. No. 731,423, Jul. 17, 1991, abandoned.

[30] Foreign Application Priority Data

Nov. 7, 1990 [DE] Germany ............ 40 35 309.5

[51] Int. Cl.⁶ ............................................. H04N 9/87
[52] U.S. Cl. ................................. 358/330; 358/340
[58] Field of Search ............... 358/310, 335, 315, 330, 358/320, 314, 340; 360/36.1, 65; 348/683, 536; H04N 9/87

[56] References Cited

U.S. PATENT DOCUMENTS

| | | | |
|---|---|---|---|
| 3,375,462 | 3/1968 | McTaggart | 358/158 |
| 3,824,620 | 7/1974 | Länger | 360/38.1 |
| 3,925,811 | 12/1975 | Kenney | 358/314 |
| 4,017,895 | 4/1977 | Oprandi et al. | 360/38.1 |
| 4,106,063 | 8/1978 | Lackner et al. | 360/38.1 |
| 4,152,733 | 5/1979 | Melwisch | |
| 4,827,511 | 5/1989 | Masuko | 348/683 |
| 4,833,371 | 5/1989 | Boon et al. | 358/158 |
| 4,835,622 | 5/1989 | Martens | 358/336 |
| 4,984,093 | 1/1991 | Schmidtmann et al. | 358/330 |
| 5,050,002 | 9/1991 | Suzuki et al. | 358/314 |

FOREIGN PATENT DOCUMENTS

| | | |
|---|---|---|
| 0365330 | 4/1990 | European Pat. Off. |
| 3516913 | 10/1986 | Germany |
| 3539816 | 5/1987 | Germany |
| 3809394 | 10/1989 | Germany |
| 3915454 | 12/1989 | Germany |

OTHER PUBLICATIONS

Patent Abstracts of Japan, vol. 10, No. 65 (E-388) (2122), Mar. 14, 1986 & JP-A-60 216 681 (Sony) Oct. 30, 1985.
DE-Z: Reime, Gerd: Bildverbesserung im Detail. In: Funkschau, H.18, 1988, S. 60–63.

*Primary Examiner*—Tommy P. Chin
*Assistant Examiner*—Huy Nguyen
*Attorney, Agent, or Firm*—Ware, Fressola, Van der Sluys & Adolphson

[57] ABSTRACT

A brightness signal distortion correction circuit (8, 11, 21) is provided for a video recorder, having distortion correction circuit (11), responsive to frequency-modulated brightness signals, and further responsive to feedback disturbance recognition control signals (U, J), for providing distortion corrected brightness signals; and also having disturbance recognition circuit (21), responsive to the distortion corrected brightness signals, for providing the feedback disturbance recognition control signals (U, J). In one embodiment, the distortion correction circuit (11) includes an adjustable transmission circuit (8) being arranged between the distortion correction circuit (11) and the disturbance recognition circuit (21), and having a voltage divider circuit (50, 51) including a resistor (51) and first and second diode circuit (50), responsive to the disturbance recognition control signals (J). In another embodiment the distortion correction circuit (11) includes adjustable threshold switching circuit (16), which is responsive to the feedback disturbance recognition control signal (I).

16 Claims, 5 Drawing Sheets

Fig. 1

VIDEO RECORDER WITH DISTORTION CORRECTOR CIRCUIT

This is a continuation of copending application(s) Ser. No. 07/731,423 filed Jul. 17, 1991, now abandoned.

BACKGROUND OF THE INVENTION

1. Field of the Invention

The present invention relates to a video recorder with a distortion corrector circuit.

2. Description of the Prior Art

From the German patent specification DE-3809394 there is known a distortion corrector circuit arranged in the signal path for processing the frequency-modulated brightness signals of a video recorder and containing a band-pass filter that is tuned to the deflection range of the part of the brightness signal that actually reproduces the brightness. This band-pass filter consists of a filter circuit component located in the signal path and a coupling component arranged downstream thereof. A diode switch is also connected in parallel with the output of the filter circuit component. When the oscillation amplitudes of the frequency-modulated brightness signal at the output side of the filter circuit component exceed a switching voltage of the diode switch, the said voltage being defined in the vicinity of the flection point of the diode switch characteristic, the diode switch will pass from a blocked state (off-state) to a conducting state (on-state) in this part of the characteristic and, together with the filter circuit component and the conducting state d.c. resistance of the diode switch, will form a transit-time controller with an amplitude-dependent retardation of tile transit time of the frequency-modulated brightness signal. In this switching state of the distortion corrector circuit the transit time of the frequency-modulated brightness signals is therefore retarded in a manner proportional to the amplitude of their oscillations, so that these signals have their transit time corrected. This transit time retardation compensates frequency and phase frequency characteristic errors, especially in the lower-frequency range of the lower sideband of the carrier frequencies of the frequency-modulated brightness signal immediately adjacent to the range of variation of the carrier oscillations, so that the amplitude-modulated brightness signals at the output side of the frequency modulator will maintain a linear frequency characteristic up to very high video frequencies (beyond 3 MHz), thereby making it possible to attain a very high image resolution in the image reproduction from the videotape without any additional noise. On the other hand, given small oscillation amplitudes of the transmitted frequency-modulated brightness signals that do not exceed the threshold value of the diode switch and therefore maintain the diode switch in its off-state, so that the entire distortion corrector circuit will be in the state of bandpass filter operation, the resonance effects of the band-pass filter, which to all intents and purposes trigger the basic or carrier oscillations of the frequency-modulated brightness signal, will make themselves felt. This leads to the suppression of the low oscillations of the lower sideband of the frequency-modulated brightness signals, the said frequencies having superposed on them the carrier frequencies of the frequency-modulated brightness signals and being capable—given adequate amplitudes in the vicinity of their maximum amplitude—of taking the carrier frequencies of the frequency-modulated brightness signal out of the switching range of the frequency modulator. Furthermore, this will also increase the amplitude of the carrier oscillations themselves and reduce the noise signals in the frequency range above the carrier oscillations.

These measures ensure that a sharper image will be reproduced on the screen. Furthermore, the arrangement substantially eliminates the edge noises that disturb image reproduction, especially the noises due to vertical brightness edges, as well as disturbing reflections and the defects described as "flitter".

However, the practical application of these measures has shown that the quality of the recording of video information on the tape of a video cassette and the quality of the video tapes themselves are so widely divergent as to make it impossible to find a design or dimensioning of the known distortion corrector circuit that can cover in a satisfactory manner this wide range of differences in quality of the video cassettes to be reproduced.

SUMMARY OF THE INVENTION

Starting from this insight, the present invention is therefore underlain by the task of further developing a video recorder of the type just described and of doing so in such a manner that—over a very wide range of the disturbed oscillation behaviour of the frequency-modulated brightness signal—the distortion corrector circuit will perform the amplitude-dependent compensation of the transit time and will further compensate the disturbed oscillations in such a way as to ensure image reproduction with the least possible disturbances while maintaining the greatest possible sharpness of the image. According to the present invention, this task is solved by the measures described in the characterizing part of claim 1 or claim 6.

The starting point of the solution is represented by the insight that disturbances will occur during the reproduction of video images above all when the amplitudes of the slow oscillations of the lower sideband of the frequency-modulated brightness signals arrive at the order of magnitude of the carrier oscillations of the frequency-modulated brightness signals. A substantial attenuation of these reproduction disturbances can therefore be obtained by reducing the ratio between the amplitudes of the low oscillations of the lower sideband and the amplitudes of the carrier oscillations of the frequency-modulated brightness signal. These measures of the present invention have the effect of setting the starting level of a transmission circuit upstream of the distortion corrector circuit or the switching level of the threshold switch via the ascertained average fault rate and an appropriate setting signal formed therefrom and to do this in such a manner that the distortion corrector circuit will for all intents and purposes still be working as an amplitude-controlled transit-time retarder circuit and ensure playback of the image with the best possible sharpness and the least possible disturbances due to flitter and edge noises.

As soon as image reproduction becomes subject to additional disturbances with an error rate that substantially exceeds the average error rate, the level of the frequency-modulated brightness signal on the input side of the distortion corrector circuit or the threshold voltage of the threshold switch is changed to such an extent that the distortion corrector circuit will be caused by these disturbed frequency-modulated brightness signals to pass predominantly into the switching state of a band-pass filter circuit and—for the entire duration of this high disturbance rate—will work predominantly in the band-pass filter state and will therefore compensate the disturbed pattern of the oscillations of the frequency-modulated brightness signal in such a manner as to ensure that these oscillations will no longer produce any noticeable disturbances on the screen.

The setting of the level of the frequency-modulated brightness signal on the input side of the distortion corrector circuit, just like the setting of the switching level of the threshold switch of the distortion corrector circuit, acts like a displacement into a range in which the distortion corrector circuit is always set for the reproduction of video images with optimal sharpness (definition). In this way the image reproduction of a video recorder in accordance with the present, invention is optimally matched to the quality of the video recording on a video tape, to the quality of the tape material itself, and the reproduction characteristics of the video recorder. The measures in accordance with the present invention therefore make it possible to reproduce video images on a screen with a considerable quality improvement as compared with the previous state of the art of image reproduction, i.e. relatively free of disturbances and with the best possible definition, and this even when the quality of the recording is poor and the reproduction channel employed is of poor transmission quality.

The dependent claims describe advantageous embodiments of the invention, which will be discussed in greater detail in the description hereinbelow.

DETAILED DESCRIPTION OF THE INVENTION

Figure 1:
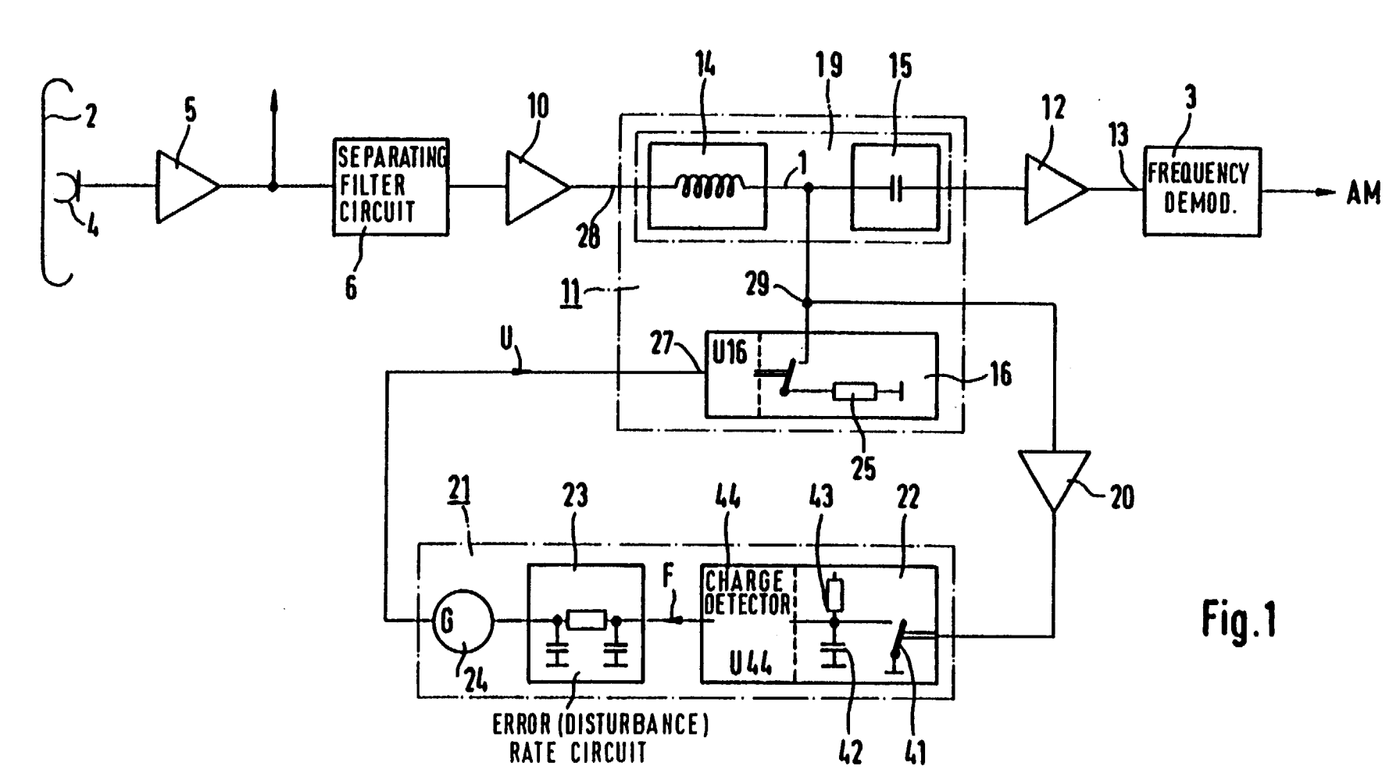
FIG. 1 shows the block diagram of a signal path in accordance with the invention to be followed by the frequency-modulated brightness signals scanned from a recording support in a video recorder.

FIG. 1 shows the block diagram of an embodiment of the signal path 1 in a video recorder for the frequency-modulated brightness signals scanned from a video tape 2. This embodiment extends from the video tape 2 inserted in the video recorder right through to the frequency demodulator 3 included in the signal path 1, The frequency demodulator 3 being used to convert the frequency-modulated brightness signal from an FM signal into an AM signal. The video signals recorded on the video tape 2 are scanned by the video head 4 of the video recorder and then pass to the signal input 13 of the frequency demodulator 3 via a head amplifier 5, a separating filter circuit 6, a buffer amplifier 10, a distortion corrector circuit 11, and a further buffer amplifier 12. The separating filter circuit 6 serves to separate the frequency-modulated brightness signals from other signals scanned from the video tape 2. In the embodiment here illustrated the distortion corrector circuit 11 consists of an inductive filter circuit component 14, a capacitative coupling component 15 on the downstream side thereof, and a threshold switch 16 connected to the signal path 1 at a point between the filter circuit component 14 and the coupling component 15, where the switching level U16 of the threshold switch 16 can be set by means of a setting signal acting via the setting input 27. The filter circuit component 14 and the coupling component 15 of the distortion corrector circuit 11 are designed and dimensioned in such a manner that—when the threshold switch 16 is in the nonconducting state—these two circuit components will form a band-pass filter 19 with a bandwidth such as to transmit the range of variation of the carrier oscillation of the frequency-modulated video signal, the frequency of the oscillation being the direct representation of the brightness of the image line to be transmitted. Furthermore, the filter circuit component 14 is so designed and so dimensioned that—when the threshold switch 16 is in the conducting state—the filter circuit 16, together with the conducting-state resistance 25 of the threshold switch, will constitute a transit-time retarder 14/25 to control the transit time as a function of the amplitude. This transit time controller substantially compensates the phase errors that the frequency-modulated brightness signal has suffered during the recording on the video tape 2 and the subsequent scanning therefrom.

Figure 2A:
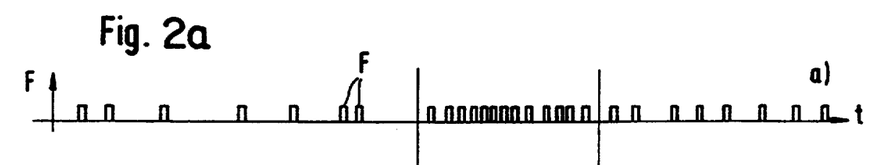
FIG. 2 shows the diagrams a), b) and c) illustrating the production of the setting signal to set an optimal quality of image reproduction, such signal being dependent on the rate of disturbed oscillations.
Figure 2B:
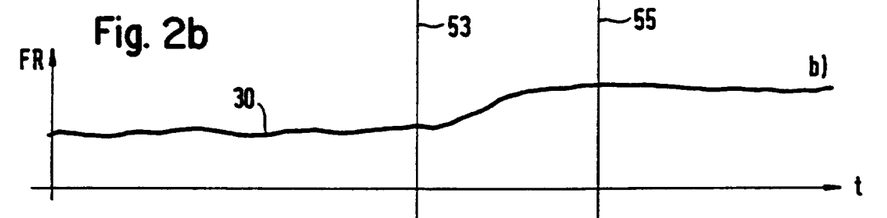
Figure 2C:
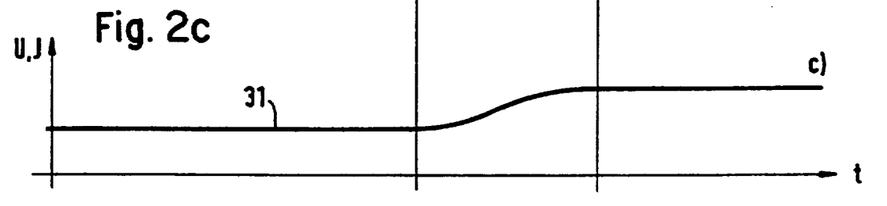

A disturbance recognition circuit 21 is connected to the signal path 1 in the distortion corrector circuit 11 via another buffer amplifier 20. In the embodiment here illustrated this disturbance recognition circuit contains a disturbed oscillation detector 22, a disturbance (error) rate circuit 23, and a setting signal generator 24. The disturbed oscillation detector 22 recognizes individual oscillations of the frequency-modulated brightness signal transmitted through the signal path 1 that are either missing or do not exceed a certain recognition threshold, producing an error signal F every time such a disturbed oscillation is detected. The error rate circuit 23 uses the rate of these error signals F(FIG. 2a) to form an electric error rate signal 30 (FIG. 2b) and this signal is then used by the setting signal generator 24 to produce a setting signal 31 (FIG. 2c) for the setting input 27 of the threshold switch 16 that corresponds to the magnitude of the error rate signal 30.

Figure 3:
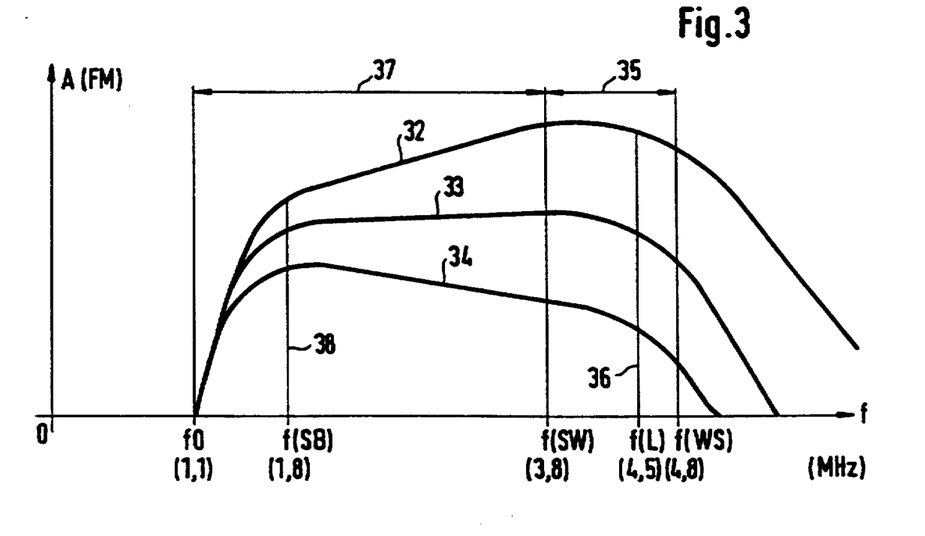
FIG. 3 shows the diagrams of the frequency pattern of the frequency-modulated brightness signal on the input side of the distortion corrector circuit of the embodiment illustrated in FIG. 1 for a recording and FM transmission of high, medium and low quality.

Given the presence of the disturbance recognition circuit 21 and the adjustable value of the threshold level (FIG. 4) that it controls, it becomes possible to match the distortion corrector circuit 11 to the different recording qualities of the video tapes 2 and the transmission quality of the scanned signal up to the signal input 28 of the distortion corrector circuit 11 in the signal path 1 for the frequency-modulated brightness signals. The diagram of FIG. 3 shows the frequency response of the amplitudes A(FM) of the frequency-modulated brightness signals plotted over the frequency axis f for three different recording qualities at the signal input 28 of the distortion corrector circuit 11, namely high quality (Curve 32), normal quality (Curve 33) and poor quality (Curve 34). This diagram indicates a range of variation 35 of the carrier oscillations 36 of the frequency-modulated brightness signal the frequency f(L) of these oscillations characterizing the actual brightness value of the transmitted signal. This range is followed on the low-frequency side by the lower sideband 37, of which the oscillations 38 are responsible for the resolution and/or the sharpness of the reproduced video image. In the embodiment here illustrated the frequency f(L) of the schematically represented carrier oscillation is 2.5 times greater than the frequency f(SB) of the sideband oscillation represented by the vertical distance 38 that is superposed on the carrier oscillation 36. The effect of this superposition is that the oscillation sequence of the carrier oscillation will from time to time go beyond the zero line area of the frequency-modulated brightness signals transmitted in signal path 1 and thus cause disturbances during the demodulation in the frequency demodulator 3 (as schematically illustrated in diagram a) of FIG. 4). This diagram provides a schematic illustration of the oscillation sequences 38.1, 38.2 and 38.3 of the sideband oscillation 38 for a recording of high quality (38.1), a recording of normal quality (38.2) and a recording of poor quality (38.3) onto which there are superposed the carrier oscillations 36 of a recording of high quality, a recording of normal quality and a recording of poor quality, thus producing the oscillation sequences 39.1, 39.2 and 39.3 of a frequency-modulated brightness signal of a recording of high quality (39.1), normal quality (39.2) and poor quality (39.3) shown in diagram a). It can be seen from this diagram that the half-wave 39.22 of the oscillation sequence 39.2 of a normal recording quality and the half-waves 39.32 and 39.35 of the oscillation sequence 39.3 of a poor recording quality do not overstep the zero line 26 of the frequency-modulated brightness signal. Also plotted in diagram a) of FIG. 4 are the lines 40.1, 40.2 and 40.3, which correspond to the threshold values U16.1, U16.2 and U16.3 of the threshold switch that are set by the setting signal 31 of the disturbance recognition circuit 21 at the setting input 27 of the threshold switch 16 during the transmission of frequency-modulated brightness signals in a recording of high quality (Line 40.1), normal quality (Line 40.2) and poor quality (Line 40.3). Within the area round the zero line 26 that is delimited by the lines 40.1 or 40.2 or 40.3 the distortion corrector circuit 11 acts as a band-pass filter for the carrier oscillations 36 of the frequency-modulated brightness signals, while outside this area it behaves as an amplitude-controlled transit-time retarder whose retardation time is determined by the part of the amplitude that lies beyond these delimitation lines 40.1, 40.2 and 40.3. In the embodiment here illustrated the switching process takes place with a switching pattern that corresponds to that of a switching diode at the flection point of its characteristic. Demodulation disturbances due to the switching process are therefore avoided.

Figure 4A:
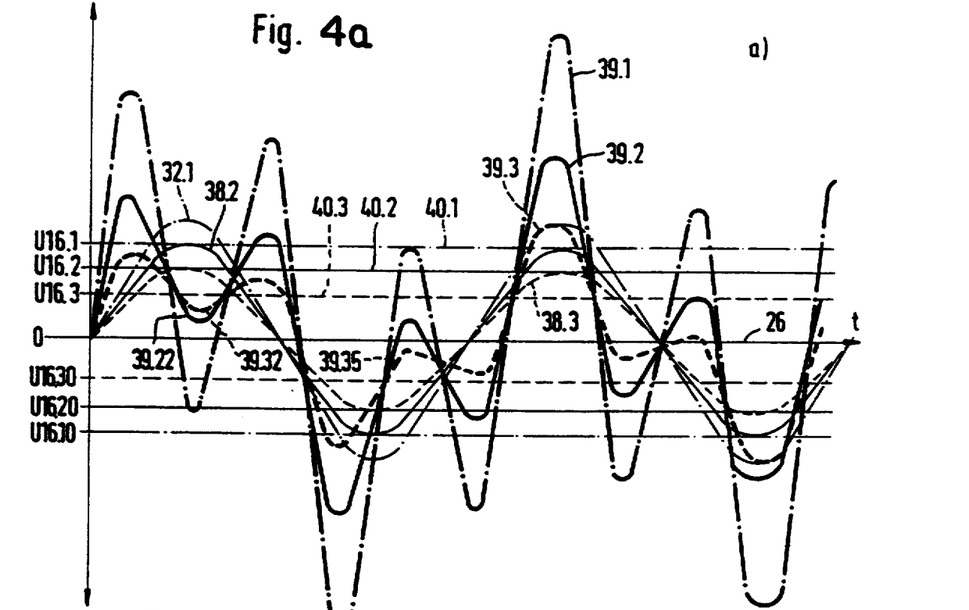
FIG. 4 shows diagrams (a) to (d3) of the sequence of oscillations of the frequency-modulated brightness signal on the input side of the distortion corrector circuit (4a) and on the input side of the threshold switch (4b), of the output signals of the disturbed oscillation detector (4c1, 4c2, 4c3) and of the rate of disturbed signals (4d1, 4d2, 4d3) in the case of high, medium and low transmission quality.
Figure 4B:
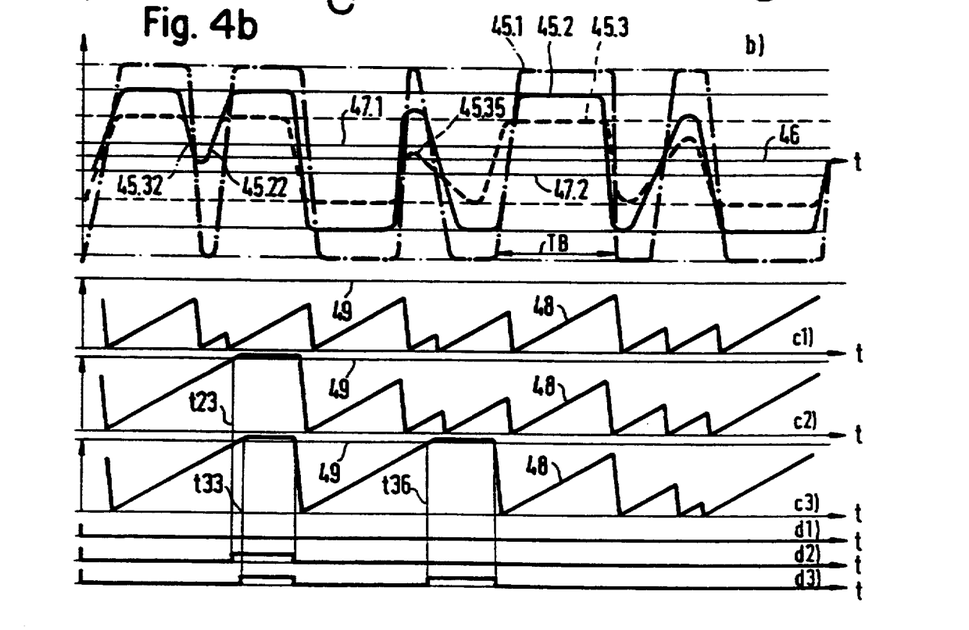

Diagram b) of FIG. 4 illustrates the oscillation sequences 45.1, 45.2 and 45.3 that the distortion corrector circuit 11, acting under the influence of the set threshold levels U16.1, U16.2 and U16.3, has formed at the signal input 29 of the threshold switch 16 from the oscillation sequences 39.1 to 39.3 of the frequency-modulated brightness signals in the signal path 1 illustrated in FIG. 4a and which are evaluated by the disturbance recognition circuit 21. Given the inductive intermediate storage of the electric energy of the part of the half-waves that exceeds the threshold level while the distortion corrector circuit 11 operates as a transit-time retarder, the amplitude of the subsequent half-wave 39.22 will become considerably enlarged when the distortion corrector circuit 11 acts as a band-pass filter, so that in the embodiment here illustrated the half-wave 45.22 of the oscillation sequence 45.2 in the signal path 1 at the signal input 29 of the threshold switch 16 will overstep the zero line 46 (FIG. 4b), which is also the switching-point line of the frequency demodulator 3. Consequently, all the half-waves of the oscillation sequences 39.1 to 39.3 illustrated in diagram a) of FIG. 4, which have their counterpart in the oscillation sequences 45.1 to 45.3 in diagram b) of FIG. 4, will be evaluated by the frequency modulator 3. In diagram b) of FIG. 4, there are also shown—on either side of the zero line (or switching-point line) 46 and lying close to it—the lines 47.1 and 47.2 which, form a switching threshold for recognition thresholds Ue1 and Ue2 of the oscillation disturbance detector 22 of the disturbance recognition circuit 21 referred to the signal path 1. As soon as one of the oscillations of the oscillation sequences 45.1 to 45.3 shown in diagram b) of FIG. 4 exceeds one of the recognition thresholds 47.1 or 47.2, the discharge switch 41 (in the example here illustrated) will discharge the charging capacitor 42 of a charging component 43 of the disturbed oscillation detector 22. This discharge takes in a fraction of the length of a half-oscillation, so that the charging capacitor 42 can recharge before the attainment of a charging limit or the next discharge through the discharge switch 41. The charging circuit is dimensioned in such a manner as to ensure that the charging voltage U42 at the charging capacitor 42 will not exceed a charging threshold U44 of a charge detector 44 connected to the charging capacitor 42 within the greatest possible oscillation width TB of a half-wave of the carrier oscillations in the distortion corrector circuit 11. The charging threshold U44, in its turn, is so dimensioned that the charging voltage U42 of the charging capacitor 42 will be greater than the charging threshold U44 when the charging capacitor 42 is charged during the smallest oscillation time of a carrier oscillation 36. The curves of the charging voltages U42 at the charging capacitor 42 are shown schematically in FIG. 4 for a recording of high quality (c1), a recording of normal quality (c2), and a recording of poor quality (c3). These diagrams include a line 49 representing the charging threshold U44. Although the half-wave 45.22 for a normal-quality recording in diagram 4b does cross the switching-point line 46, this is no longer the case as regards the subsequent recognition threshold 47.2. Consequently, the charging curve 48 in diagram 4c2 will cross the line 49 of the charging threshold U44 at time t23, so that the charge detector 44 will at this time produce an error signal F for the error (disturbance) rate circuit 23, as illustrated in diagram d2) of FIG. 4 for the scanning of a video tape with normal recording quality. During the schematically represented transmission of a recording of low quality (oscillation sequence 45.3) the half-wave 45.32 does not reach the appropriate recognition threshold 47.2 and the half-wave 45.35 of the same oscillation sequence 45.3—after overstepping the switching-point line 46—does not reach the recognition threshold 47.1, so that the oscillation sequence 48 in diagram 4c3 will overstep the line 49 of the charging threshold U44 at both time t33 and time t36; the charging detector 44—as illustrated in diagram d3) of FIG. 4 for the reproduction of a poor-quality image of the video tape 2—will therefore produce an error signal F at both moments of time.

As can be seen from diagrams d1) to d3) of FIG. 4, of which diagram d1 does not contain any error signals F, the density or rate of the error signals F increases as the recording quality diminishes, so that the error rate signal 30, which is formed by the error rate circuit 23 and illustrated in diagram b) of FIG. 2, represents a measure of the recording quality and the transmission quality of the frequency-modulated brightness signals up to the signal input 28 of the distortion corrector circuit 11. The setting signal generator 24 on the downstream side of the error rate circuit Z3 uses the error rate signal 30 to form a setting signal 31 for setting the switching threshold U16 of the threshold switch 16 in such a way that—as far as possible—all the half-waves of the oscillation sequence of the frequency-modulated brightness signals passing through the distortion corrector circuit 11 will at least just cross the switching-point line 46. The disturbance recognition circuit 21 will therefore set a switching threshold U16 at the threshold switch 16 that will correspond to the average recording quality of the image playback that is being transmitted at that instant and yield the best possible image definition with an image reproduction that is just free of disturbance. In the embodiment here illustrated, the switching threshold U16 of the of the threshold switch 16 is gradually lowered (from U16.1 to U16.3) as the recording quality diminishes (from curve 32 to curve 34 in the diagram of FIG. 3).

Figure 5:
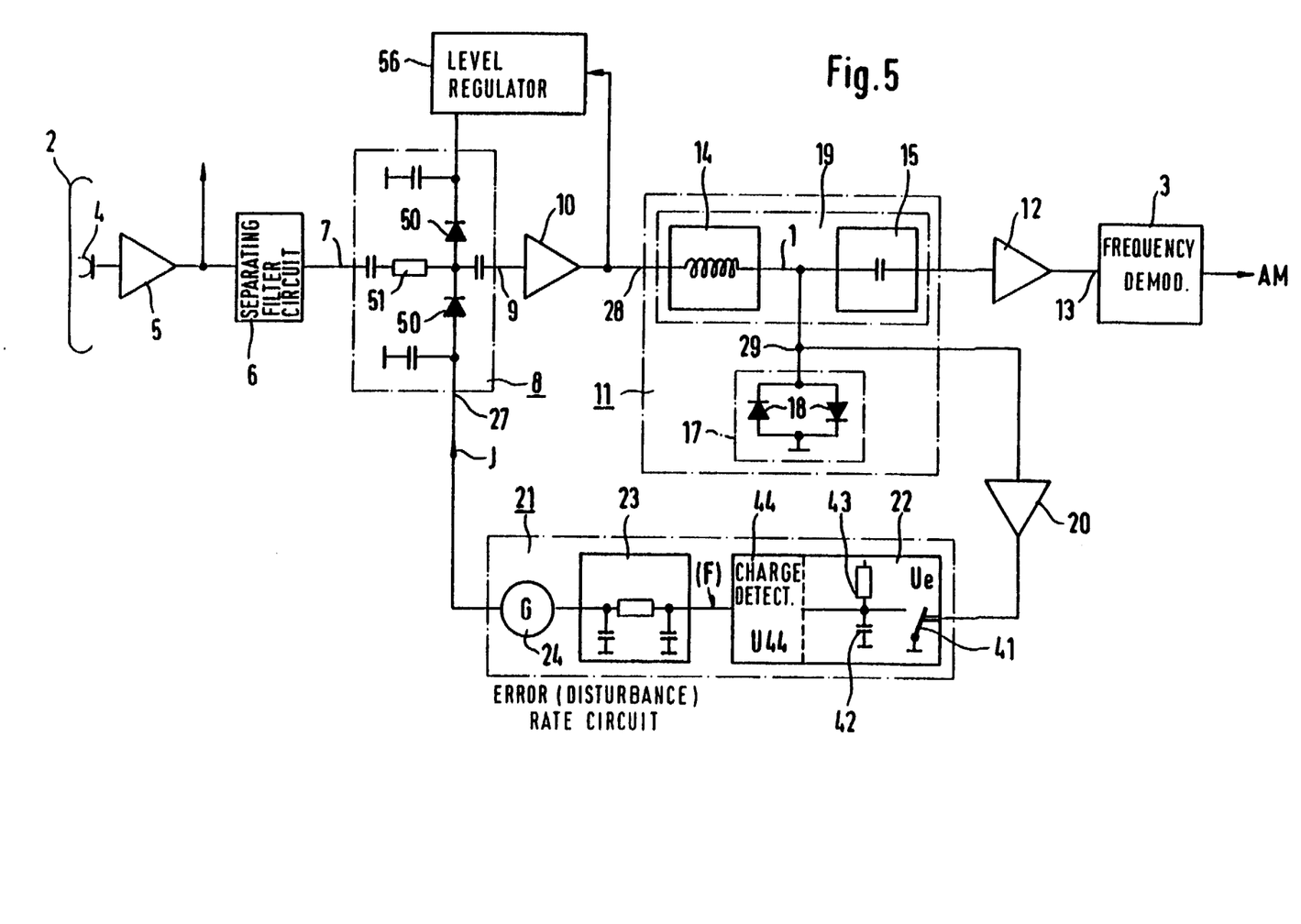
FIG. 5 shows the block diagram of another embodiment of the signal path in accordance with the invention to be followed by the frequency-modulated brightness signals scanned from a recording support in a video recorder.

FIG. 5 shows another embodiment of the signal path for the frequency-modulated brightness signals scanned from a video support 2 in a video recorder according to the present invention. Identical circuit components and signals always bear the same reference number as in FIG. 1. The embodiment illustrated by FIG. 5 essentially differs from the embodiment of such a signal path shown in FIG. 1 by virtue of the fact that the distortion corrector circuit is preceded by an adjustable transmission circuit in the form of damping circuit 8 and, further, that the setting signal 31 produced by the disturbance recognition circuit 21 is applied to the setting input 27 of the damping circuit 8 and that the threshold switch 17 of this embodiment is made up of two antiparallel switching diodes 18, whence its switching threshold U17 (see FIG. 6) is determined by the flection point of the characteristic of the two antiparallel switching diodes 18. In the embodiment here illustrated, the damping circuit 8 consists essentially of two derivation diodes 50 connected to the-signal path 1 and a series resistance 51 arranged in the signal path upstream of the derivation diodes. The series resistance 51, together with the volume resistances of the derivation diodes (which can be set by means of a d.c. setting voltage), constitutes a voltage divider for the frequency-modulated brightness signals arriving at the signal input 7 of the damping circuit 8. Damping of the frequency-modulated brightness signals in the embodiment according to FIG. 5 has its counterpart in a raising of the switching threshold U16 from, for example, U16.3 to U16.1 in the embodiment according to FIG. 1.

Figure 6A:
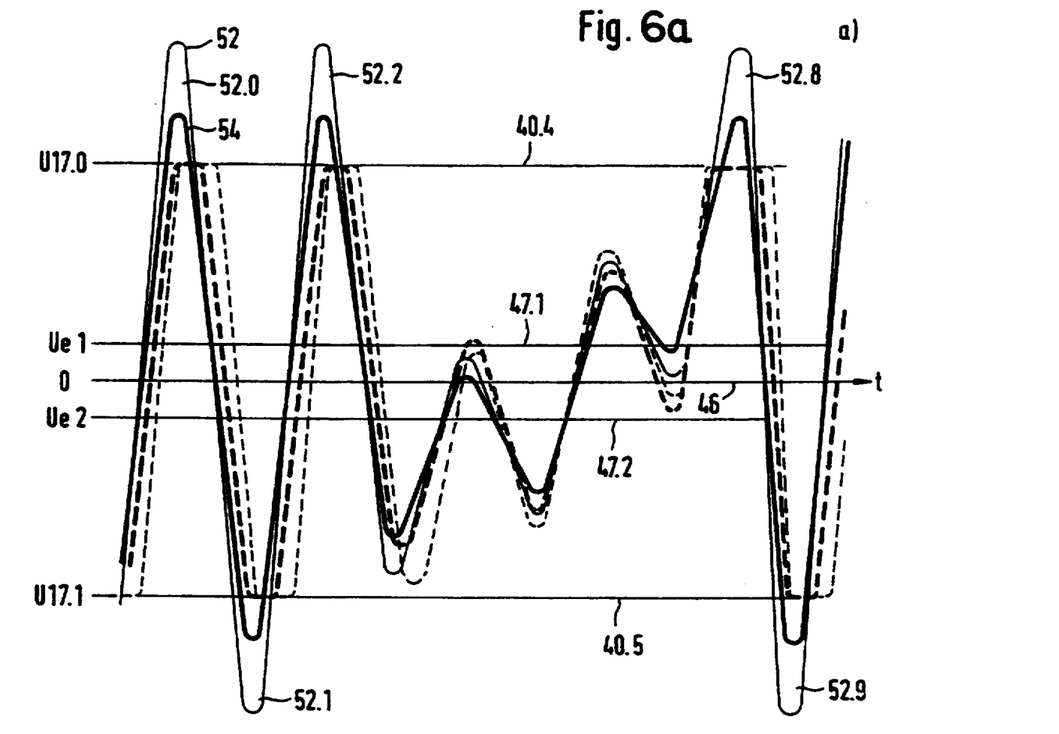
FIG. 6 shows diagrams (a) to (c2) illustrating the mode of action of the disturbed oscillation detector contained in the disturbance detection circuit of the embodiment shown in FIG. 5 in the event of a particularly high local disturbance rate.
Figure 6B:
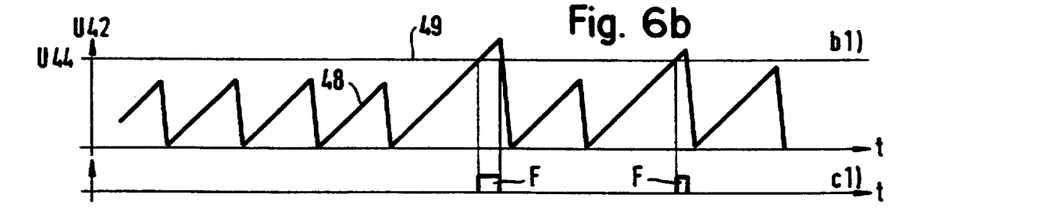
Figure 6C:
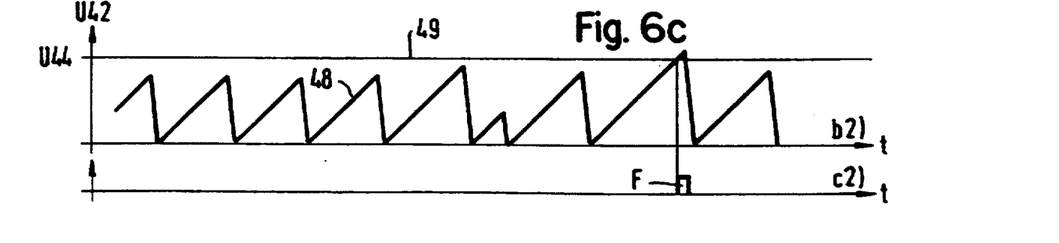

The thin unbroken line 52 in diagram a) of FIG. 6 represents an oscillation sequence of the frequency-modulated brightness signals at the signal input 28 of the distortion corrector circuit 11 for normal recording quality of image reproduction. This recording quality has its counterpart in a rate of error signals F that is shown in diagram a) of FIG. 2 to the left of the dividing line 53 and which produces an error rate signal 30 in the error rate circuit 23. This error rate signal, in its turn, produces a setting current I in the setting signal generator 24 of the disturbed signal recognition circuit 21 that will set the damping factor of the damping circuit 8 in such a manner that the mean value of the amplitudes of the normal half-oscillations 52.0 to 52.2 and 52.8 and 52.9 of the frequency-modulated brightness signals at the signal input 28 of the distortion corrector circuit 11 will constitute a certain ratio with the threshold level U17.0 applied to the signal input 28. By means of the direct-current setting voltage, this ratio is set in such a manner that the reproduced image will have the best possible definition and the least possible disturbances. A disturbance is indicated between tile half-waves 52.2 and 52.8 of the oscillation sequence 52 of the frequency-modulated brightness signals. As is shown in diagrams b1) and c1) of FIG. 6, this disturbance triggers additional error signals F in the disturbed signal recognition circuit 21. As these additional error signals accumulate, they will cause a considerable increase in the rate of the error signals F, this new condition being indicated in diagram a) of FIG. 2 to the right of the dividing line 53. As can clearly be seen from diagram b) of FIG. 2, this leads to a considerable step-up in the error rate signal 30. This temporary increase of the error rate signal 30 causes a change in the setting current I produced by the setting signal generator 24, so that the damping factor of the damping circuit 8 will become greater. The oscillation sequence of the more strongly damped brightness signal corresponding to the greater disturbance rate shown to the right of the dividing line 53 of the diagrams in FIG. 2 is represented in diagram a) of FIG. 6 by the thick unbroken line 54. Given this damping of the original oscillation sequence 52 of the frequency-modulated brightness signals, proportionally greater parts of the oscillation sequence of the frequency-modulated brightness signals will now fall within the range in which the distortion corrector circuit 11 operates as a band-pass filter, namely the parts of the oscillation sequence 54 that are projected between the lines 40.4 and 40.5 of the switching threshold U17 of the threshold switch 17 applied to the signal input 28 of the distortion corrector circuit 11. This measure ensures that the distortion corrector circuit 11 will tend to centre the oscillations of the disturbed parts of the oscillation sequence 54 more closely around the zero line 46 of the oscillation sequence 54 of the frequency-modulated brightness signals. The said zero line 46 is also the switching-point line of the frequency demodulator 3. In the disturbed zone, therefore, the disturbance signals on the screen will be considerably reduced and, at one and the same time, the image sharpness will be enhanced to the greatest possible extent. The disturbance zone thus regulated by the disturbed signal recognition circuit 21 produces an appropriately higher rate of error signals F that is added to the error rate corresponding to the recording quality as indicated in diagram a) of FIG. 2 to the right of the dividing line 55; for as long as this higher error rate pertains, it will raise the value of the error rate signal 30 shown schematically in diagrams b)

and c) of FIG. 2. This setting signal shown in diagram c) of FIG. 2, which will remain in being for as long as the greater error rate prevails, will set the damping circuit 8 in such a manner that the oscillation sequence 54 of the frequency-modulated brightness signal will be applied to the signal input 28 of the distortion corrector circuit 11. The additional rate of error signals F (diagram c2 of FIG. 6), which in the regulated state of the setting signal 31 (diagram c of FIG. 2) characterizes the magnitude of the disturbance of the disturbed part of the signal and whose production process is schematically illustrated by diagrams b) and c) of FIG. 6, will maintain this setting until such time as the local disturbance causing the higher error rate has disappeared.

In the embodiment illustrated in FIG. 5, moreover, an integrating level regulator 56 is connected to the signal path 1 upstream of the signal input 28 of the distortion corrector circuit 11. The level regulator 56 measures the average signal level in the signal path 1 upstream of the signal input 28 of the distortion corrector circuit 11 and, in the embodiment here illustrated, will set the setting current through the derivation diodes 50 of the damping circuit 8, always provided that this proves necessary, in such a manner as to ensure that the average signal level upstream of the signal input 28 of the distortion corrector circuit 11 will not fall below a value below which the image reproduction quality would be substantially reduced on account of an excessively low signal level.

In a further embodiment, which will not be discussed in greater detail, the adjustable transmission circuit 8 upstream of the signal input 28 of the distortion corrector circuit 11 takes the form of a symmetrical amplifier with a setting input that permits its amplification factor to be set, by means of an appropriate setting signal, to such value as may from time to time be required.

I claim:

1. A brightness signal distortion correction circuit for use in a video recorder that generates frequency-modulated brightness signals as part of a playback signal, comprising:

distortion correction means (11), responsive to an amplitude of the frequency-modulated brightness signals at a first input (28), and further responsive to disturbance recognition control signals (U) at a second input (27), having a band pass filter (14, 15, 19) and having phase delay means (14, 16) including threshold switching means (16) with a first state and a second state, for providing distortion-corrected frequency-modulated brightness signals which pass the band pass filter (14, 15, 19) when the threshold switching means (16) is in the first state, and which pass the phase delay means (14, 16) when the threshold switching means (16) is in the second state, wherein a switching level (U16) of the threshold switching means (16) is adjustable by the disturbance recognition control signals (U), and for further providing distortion correction control signals; and disturbance recognition means (21), responsive to the distortion correction control signals, for providing the disturbance recognition control signals (U) for adjusting the switching level (U16) of the threshold switching means (16).

2. A brightness signal distortion correction circuit for use in a video recorder that generates frequency-modulated brightness signals as part of a playback signal, comprising:

distortion correction means (11), responsive to the frequency-modulated brightness signals, for providing distortion correction control signals, and for providing distortion-corrected frequency-modulated brightness signals; and disturbance recognition means (21), responsive to the distortion correction control signals, for providing disturbance recognition control signals (J);

wherein an input of the distortion correction means (11) is coupled to an output of a level control circuit means (8) being arranged between the distortion correction means (11) and the disturbance recognition means (21), and having a voltage divider circuit (50, 51), including a series resistor (51) and two antiparallel diode means (50), and being responsive to the disturbance recognition control signals (J) for providing frequency-modulated brightness signals which have voltage levels responsive to the disturbance recognition control signals (J).

3. A brightness signal distortion correction circuit according to claim 2, wherein the disturbance recognition circuit (21) comprises:

a disturbed oscillation detector (22), responsive to the distortion correction control signals, for providing an error signal (F);

an error rate circuit (23), responsive to the error signal (F), for providing an error rate signal (30); and an error rate generator (24), responsive to the error rate signal (30), for providing disturbance recognition control signals (J).

4. A brightness signal distortion correction circuit for use in a video recorder that generates frequency-modulated brightness signals as part of a playback signal, comprising:

distortion correction means (11), responsive to the frequency-modulated brightness signals, and further responsive to disturbance recognition control signals (U) for providing distortion correction control signals, and for further providing distortion-corrected frequency-modulated brightness signals; and disturbance recognition means (21), responsive to the distortion correction control signals, for providing the disturbance recognition control signals (U);

wherein the distortion correction means (11) has a band pass filter (14, 15, 19) and has phase delay means (14, 16) including an adjustable threshold switching means (16) with a first state and a second state, responsive to an amplitude of the frequency-modulated brightness signals at an input (28), and further responsive to the disturbance recognition control signals (U) for providing distortion-corrected frequency-modulated brightness signals which pass the band pass filter (14, 15, 19) when the adjustable threshold switching means (16) is in the first state, and which pass the phase delay means (14, 16) when the adjustable threshold switching means (16) is in the second state, and for providing the distortion correction control signals; and wherein the disturbance recognition means (21) comprises a disturbed oscillation detector (22), responsive to distortion correction control signals, for providing an error signal (F);

an error rate circuit (23), responsive to the error signal (F), for providing an error rate signal (FR); and an error rate generator (24), responsive to the error rate signal (FR), for providing the disturbance recognition control signal (U).

5. A brightness signal distortion correction circuit (8, 11, 21) for a video recorder for processing frequency-modulated brightness signals, comprising a distortion correction circuit (11) arranged in a signal path (1), having a band-pass filter (19) tuned to the frequency deviation of the carrier oscillation of a frequency-modulated brightness signal that directly reproduces the frequency-modulated brightness signals when the distortion correction circuit (11) is in a first switching state, an amplitude-controlled delay circuit (14/17) that increasingly delays the phase of individual oscillations of the frequency-modulated brightness signal as the amplitude of the frequency-modulated brightness signal increases when the distortion correction circuit (11) is in a second switching state, and a threshold switch (17) connected to the band-pass filter (11), having a preset switching threshold (U17.0, U17.1), for switching the distortion correction circuit (11) with a switching pattern that corresponds to that of a switching diode at the flexion point of its characteristic from the first switching state into the second switching state whenever an oscillation sequence (52) of the frequency-modulated brightness signal received by the distortion correction circuit (11) exceeds the preset switching threshold (U17.0, U17.1);

disturbance recognition circuit (21) which detects individual oscillations (52.0–52.9) of the frequency-modulated brightness signal received by the distortion correction circuit (11) that do not exceed the threshold levels (Ue1, Ue2) of the disturbance recognition circuit (21), and for providing a control signal (31) that depends on an error rate (FR) of disturbed oscillations (52.3–52.7) so that as the error rate (FR) produced from the disturbed oscillations (52.3–52.7) increases, a level control circuit (8) being connected to the distortion correction circuit (11), responsive to the control signal (J) which is fed to a control input (27) for providing the frequency-modulated brightness signals at a particular level depending on the control signal (J).

6. A brightness signal distortion correction circuit according to claim 5, wherein the transmission circuit (8) operates as a damping circuit having a damping factor that is set by the setting input (27).

7. A brightness signal distortion correction circuit according to claim 5, wherein the transmission circuit (8) operates as a variable symmetrical amplifier with an input that permits its amplification signal to be set.

8. A brightness signal distortion correction circuit according to claim 6, wherein the damping circuit (8) is a voltage divider circuit, including a resistor (51) and first and second diodes (50) for damping the frequency brightness signals.

9. A brightness signal distortion correction circuit signal according to claim 5, wherein the brightness signal distortion circuit (8, 11, 21) further includes a level regulating amplifier (56) coupled via an integrator to the level control means (8), for maintaining the voltage value of the brightness signal (54) at input (28) of the distortion correction circuit (11) above a preset minimum value.

10. A brightness signal distortion correction circuit according to claim 5, wherein the disturbance recognition circuit (21) comprises a disturbed oscillation detector (22) of distortion corrected brightness signal (39, 52), responsive to the individual oscillations (52.0–52.9) of the distortion corrected brightness signal, for providing an error signal (F);

an error rate circuit (23), responsive to the error signal (F), for providing an error rate signal (FR); and an error rate generator (24), responsive to the error rate signal (FR), for providing the control signal (J) from the error rate signal (FR).

11. A brightness signal distortion correction circuit according to claim 5, wherein the threshold switch (17) has a switching threshold which is equal to an average voltage value of the preset switching threshold (17.1, 17.2).

12. A brightness signal distortion correction circuit (11, 21) for a video recorder for processing frequency-modulated brightness signals of a playback signal from a video tape, comprising:

distortion correction circuit (11) having a band-pass filter (19) tuned to a frequency deviation of a carrier oscillation of the frequency-modulated brightness signals that directly reproduces a wave shape of the carrier oscillation when the distortion correction circuit (11) is in a first switching state;

an amplitude-controlled delay circuit (14/25) that increasingly delays the phase of individual oscillations of the signal brightness as the amplitude of the frequency-modulated brightness signals increases when the distortion correction circuit (11) is in a second switching state; and a threshold switch (16) connected to the band-pass filter (19), having an adjustable switching threshold (U16.1, U16.10; U16.2, U16.20; U16.3, U16.30), for switching the distortion correction circuit (11) with a switching pattern that corresponds to that of two antiparallel switching diodes (18) at the flexion point of its characteristic from the first switching state into the second switching state when an oscillation sequence (39) of the frequency-modulated brightness signals received by the distortion correction circuit (11) exceeds the preset switching threshold (U16.1, U16.10; U16.2, U16.20; U16.3, U16.30), disturbance recognition circuit (21) connected to the distortion correction circuit (11), which detects individual disturbed oscillations (45.22, 45.35) of the frequency-modulated brightness signals passing through the distortion correction circuit (11) that do not exceed the threshold level (U47.1, U47.2) of the disturbance recognition circuit (21), and for providing a control signal (31) for a control input (27) that depends on an error rate (FR) of disturbed oscillations (45.22, 45.32, 45.35), so that as the error rate (FR) produced from the disturbed oscillations increases the adjustable switching threshold (40.1, 40.2, 40.3) of the threshold switch (16) is lowered via the control input (27) for switching the distortion correction circuit (11) into the second switching state.

13. A brightness signal distortion correction circuit according to claim 12, wherein the disturbance recognition circuit (21) comprises a disturbed oscillation detector (22) of distortion corrected brightness signal (39, 52), responsive to the individual oscillations (52.0–52.9) of the distortion corrected brightness signal, for providing an error signal (F);

an error rate circuit (23), responsive to the error signal (F), for providing an error rate signal (FR); and an error rate generator (24), responsive to the error rate signal (FR), for providing the control signal (J) from the error rate signal (FR).

14. A brightness signal distortion correction circuit according to claim 12, wherein the threshold switch (16, 17) has a switching threshold which is equal to an average voltage value of the preset switching threshold (40.1, 40.2, 40.3).

15. A brightness signal distortion correction circuit (8, 11, 21) for a video recorder, for processing frequency-modulated brightness signals having an oscillation sequence (52) with a phase and amplitude, comprising:

a level control circuit (8) having a resistor (51) and first and second diodes (50) and having a control input (27), responsive to the frequency-modulated brightness signals, for providing the frequency-modulated brightness signals (45) at a voltage output level;

distortion correction circuit (11), being connected to the level control circuit (8), and including a band-pass filter (19) having an inductance means (14) and a capacitive coupling (15), and being tuned to the frequency deviation of a carrier oscillation of the frequency-modulated brightness signals, the band-pass filter (19) directly reproducing the frequency-modulated brightness signals when the distortion correction circuit (11) is in a filtering state, and a threshold switch (17) having switching diode means (18) with preset switching thresholds (U17.0, U17.1), into the filtering state when the amplitude of the frequency-modulated brightness signal (45) is within the range of the preset switching thresholds (U17.0, U17.1), and for switching the distortion correction circuit (11) into a delayed-phase switching state when the amplitude of the oscillation sequence 52 of the frequency-modulated brightness signals (45) is not within the range of the preset switching threshold (U17.0, U17.1);

a disturbance recognition circuit (21) connected between the distortion correction circuit (11) and the level control means (8), having charge detector (22), an error rate circuit (23) and a control signal generator (24), for detecting disturbed oscillations (52.4, 52.7) of the frequency-modulated brightness signals (45), and for providing a control signal (U, J) to the control input (27) of the level control means (8) to continuously adjust the voltage output level of the level control means (8) depending on a rate of a disturbed oscillation error rate signal (FR).

16. A brightness signal distortion correction circuit (11, 21) for a video recorder, for processing frequency-modulated brightness signals (39) having an oscillation sequence (39) with a phase, an amplitude, and a zero line (46), comprising a distortion correction circuit (11), including a band-pass filter (19) tuned to a frequency deviation of a carrier oscillation of the frequency-modulated brightness signals (39), the band-pass filter (19) directly reproducing the frequency-modulated brightness signals (39) when the distortion correction circuit (11) is in a band-pass filter switching state, an amplitude-controlled delay circuit (14/25) that increasingly delays the phase of individual oscillations of the frequency-modulated brightness signal (39) as the amplitude of the frequency-modulated brightness signals (39) increases when the distortion correction circuit (11) is in a delayed-phase switching state, and an adjustable threshold switch (16) having a controlled switching threshold (U16.1, U16.10; U16.2, U16.20; U16.3, U16.30), that switches the distortion correction circuit (11) between the by-pass switching state and the delay-phase switching state depending on the amplitude of the oscillation sequence of the frequency-modulated brightness signals (39) with respect to the controlled switching threshold (U16.1, U16.10; U16.2, U16.20; U16.3, U16.30); and disturbance recognition circuit (21) connected to the distortion correction circuit (11), having an oscillation disturbance detector (22), for detecting disturbed oscillations (45.22, 45.32, 45.35) of the frequency-modulated brightness signals (39) that do not exceed threshold levels (47.1, 47.2) of the disturbance signal recognition circuit (21), and for providing a control signal (U) for the control input (27) of the distortion correction circuit (11) to continuously adjust the switching threshold (U16.1, U16.10; U16.2, U16.20; U16.3, U16.30).

* * * * *

UNITED STATES PATENT AND TRADEMARK OFFICE
CERTIFICATE OF CORRECTION

PATENT NO.   :   5,430,551
DATED        :   July 4, 1995
INVENTOR(S)  :   G. Reime It is certified that error appears in the above-indentified patent and that said Letters Patent is hereby corrected as shown below:

At column 10, lines 40 and 54, please insert a comma after "(U)" in each instance.

At column 13, line 38, after "(U17.0, U17.1),", please insert -- and for switching the distortion correction circuite (11) --.

at line 40, please change "signal" to --signals--.

Signed and Sealed this

Twenty-third Day of January, 1996

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,430,551
DATED : July 4, 1995
INVENTOR(S) : G. Reime

It is certified that error appears in the above-indentified patent and that said Letters Patent is hereby corrected as shown below:

At column 10, lines 40 and 54, please insert a comma after "(U)" in each instance.

At column 13, line 38, after "(U17.0, U17.1),", please insert -- and for switching the distortion correction circuit (11) --.

at line 40, please change "signal" to --signals--.

This certificate supersedes Certificate of Correction issued January 23, 1996.

Signed and Sealed this

Nineteenth Day of March, 1996

Attest:

BRUCE LEHMAN

*Attesting Officer*     *Commissioner of Patents and Trademarks*